US009423971B2

(12) United States Patent
Song et al.

(10) Patent No.: US 9,423,971 B2
(45) Date of Patent: Aug. 23, 2016

(54) METHOD AND SYSTEM FOR ADAPTIVELY ASSIGNING LOGICAL BLOCK ADDRESS READ COUNTERS USING A TREE STRUCTURE

(71) Applicant: SanDisk Technologies, Inc., Plano, TX (US)

(72) Inventors: Yiwei Song, Union City, CA (US); Xinde Hu, San Jose, CA (US); Daniel Tuers, Kapaa, HI (US)

(73) Assignee: SanDisk Technologies LLC, Plano, TX (US)

( * ) Notice: Subject to any disclaimer, the term of this patent is extended or adjusted under 35 U.S.C. 154(b) by 67 days.

(21) Appl. No.: 14/506,147

(22) Filed: Oct. 3, 2014

(65) Prior Publication Data
US 2016/0098215 A1  Apr. 7, 2016

(51) Int. Cl.
*G06F 3/06* (2006.01)
*G06F 12/06* (2006.01)

(52) U.S. Cl.
CPC .............. *G06F 3/0619* (2013.01); *G06F 3/064* (2013.01); *G06F 3/0653* (2013.01); *G06F 3/0679* (2013.01); *G06F 12/0646* (2013.01)

(58) Field of Classification Search
CPC ... G06F 3/0614; G06F 3/0619; G06F 3/0631; G06F 3/064; G06F 3/0641; G06F 3/0644; G06F 3/0653; G06F 3/0679; G06F 12/0646; G06F 12/0653; G06F 12/0223; G06F 12/023; G06F 12/0238; G06F 12/0246
See application file for complete search history.

(56) References Cited

U.S. PATENT DOCUMENTS

| | | | |
|---|---|---|---|
| 2009/0125671 A1* | 5/2009 | Flynn ....................... | G06F 9/52 711/103 |
| 2014/0136884 A1* | 5/2014 | Werner ............... | G06F 11/2094 714/6.11 |
| 2014/0173239 A1* | 6/2014 | Schushan ........... | G11C 16/3427 711/165 |
| 2015/0178188 A1 | 6/2015 | Grin et al. | |
| 2015/0262714 A1* | 9/2015 | Tuers ............... | G11C 29/50004 714/721 |

* cited by examiner

*Primary Examiner* — Hal Schnee
(74) *Attorney, Agent, or Firm* — Brinks Gilson & Lione

(57) ABSTRACT

Systems, apparatuses, and methods are provided that dynamically reassign counters (or other memory monitors) in a memory. A plurality of counters may be assigned to different address ranges within an overall address range of a memory. The value of the counter may be indicative of activity, such as reads, within a respective assigned address range. Depending on the value of the counter, the respective address range of the counter may be dynamically changed. For example, a counter with a high value (indicating higher activity within the address range) may have its respective address range divided, with two counters being assigned to each of the divided address ranges. Likewise, counters with low values (indicating less activity within the address ranges) may have their respective address ranges combined, with a single counter being assigned to the combined address ranges. Thus, in subdividing and combining address ranges, the number of counters assigned may remain the same, while still monitoring the activity with the overall address range.

22 Claims, 9 Drawing Sheets

METHOD AND SYSTEM FOR ADAPTIVELY ASSIGNING LOGICAL BLOCK ADDRESS READ COUNTERS USING A TREE STRUCTURE

TECHNICAL FIELD

This application relates generally to managing data in a memory system. More specifically, this application relates to adaptively assigning counters to different sections of memory in the memory system.

BACKGROUND

Flash data memory systems read and write data to the flash memory. Reading data from the flash memory may cause nearby cells in the same memory block to change over time (such as become programmed). This is commonly known as read disturb. The threshold number of reads is generally in the hundreds of thousands of reads between intervening erase operations. If reading continually from one cell, that cell will not fail; rather, one of the surrounding cells on a subsequent read. To avoid the read disturb problem, the controller in the flash memory counts the total number of reads to a block since the last erase. When the count exceeds a target limit, the affected block is copied over to a new block, erased, and then released to the block pool. The original block is as good as new after the erase. If the controller does not intervene in time, however, a read disturb error may occur with possible data loss if the errors are too numerous to correct with an error-correcting code.

Counters that monitor the total number of reads to a block consume a lot of memory space. For example, a 4 byte counter multiplied by the number of blocks in a memory system, which can be 256K blocks in a solid state drive (SSD), equates to about 1 MB of space just to track simple read counters.

BRIEF SUMMARY

Systems and methods for adaptively assigning counters (or other type of memory counter) in a memory device are disclosed. In one aspect, a method is disclosed. The method, which is performed in a memory device, includes: assigning a counter to an address range within a memory of the memory device, a value of the counter being indicative of predetermined activity within the address range; analyzing the value of the counter; and in response to the analysis: selecting a new address range that is different from and at least partly within the address range; and dynamically reassigning the counter or assigning a new counter to the new address range.

In another aspect, an apparatus is disclosed. The apparatus includes: an assigner module configured to assign a plurality of memory monitors to respective address ranges of a memory device such that a total of the respective address ranges assigned for the plurality of memory monitors equals an overall address range; an analyzer module configured to analyze values associated with one or more of the plurality of memory monitors, the value of a respective memory monitor indicative of at least one aspect in the respective address range; and a reassignor module configured to reassign at least one respective address of a respective memory monitor based on the analyzed values such that the total of the respective address ranges for the plurality of memory monitors, after reassignment, equals the overall address range.

In still another aspect, an apparatus is disclosed. The apparatus includes: a counter configured to store a value; a counter assignment module configured to assign the counter to an address range within a memory, the value of the counter indicative of reads within the address range; a counter analyzer configured to analyze the value of the counter; and a counter reassignor module configured to reassign, based on the analysis of the value of the counter, the counter to a different address range within the memory.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

A flash memory system suitable for use in implementing aspects of the invention is shown in FIGS. 1-6. A host system 100 of FIG. 1A stores data into and retrieves data from a memory system 102. The memory system 102 may be flash memory embedded within the host, such as in the form of a solid state disk (SSD) drive installed in a personal computer. Alternatively, the memory system 102 may be in the form of a card that is removably connected to the host system 100 through mating parts 104 and 106 of a mechanical and electrical connector as illustrated in FIG. 1A. A flash memory configured for use as an internal or embedded SSD drive may look similar to the schematic of FIG. 1A, with the primary difference being the location of the memory system 102 internal to the host system 100. SSD drives may be in the form of discrete modules that are drop-in replacements for rotating magnetic disk drives.

Figure 1A:
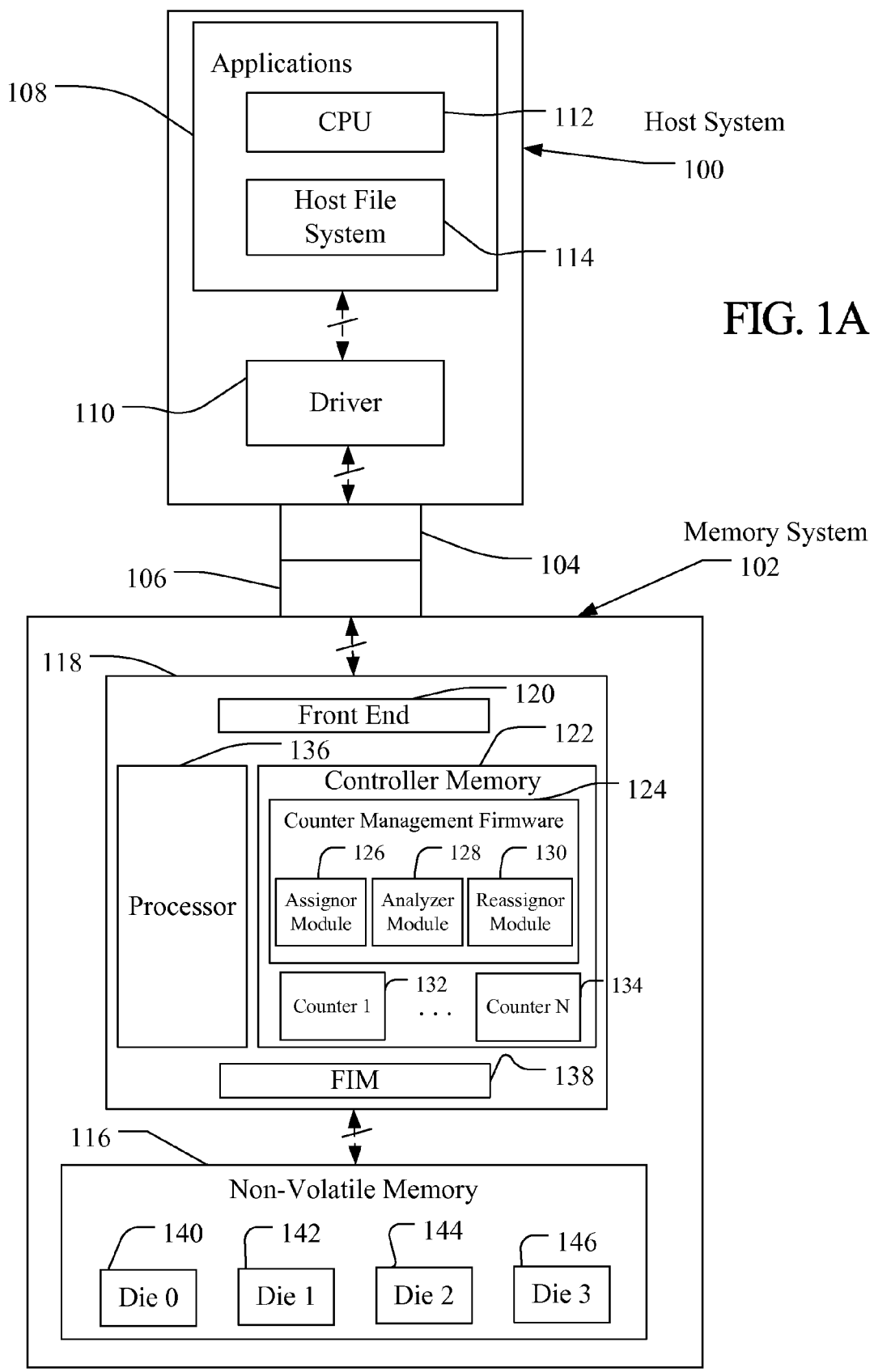
FIG. 1A illustrates a host connected with a memory system having a multi-bank non-volatile memory containing multiple die.

The host system 100 of FIG. 1A may be viewed as having two major parts, insofar as the memory system 102 is concerned, made up of a combination of circuitry and software. They are an applications portion 108 and a driver portion 110 that interfaces with the memory system 102. In a personal computer, for example, the applications portion 110 can include a processor 112 running word processing, graphics, control or other popular application software, as well as the file system 114 for managing data on the host system 100. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1A may comprise a semiconductor memory device. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Referring back to FIG. 1A, the memory system 102 may include non-volatile memory, such as flash memory 116, and a system controller 118 that both interfaces with the host system 100 to which the memory system 102 is connected for passing data back and forth and controls the flash memory 116. Other types of non-volatile memory are contemplated, such as resistive memory, which may be composed of a plurality of resistive memory cells, and ferroelectric memory.

When communicating with the memory system, the host system 100 may send logical addresses of data, such as in the form of a range of logical block addresses (LBAs). The system controller 118 may then convert the LBAs, in one or more steps, to the actual physical addresses on the flash memory 116. The system controller 118 may perform a logical address-to-actual physical address conversion in order to map to the actual physical addresses. For example, the LBAs from the host system 100 may be mapped to memory system internal logical addresses, and the memory system internal logical addresses are mapped to the actual physical addresses. As another example, the LBAs from the host system 100 may be mapped directly to the actual physical addresses.

FIG. 1A illustrates that the flash memory 116 includes four memory die 138, 140, 142, 144. The number of memory die is merely for illustrative purposes. Other numbers of memory die are contemplated.

The system controller 118 may perform a variety of functions. FIG. 1A illustrates the various functions of the system controller 118, including a front end 120, a processor 136, a controller memory 122, and one or more flash interface modules (FIMs) 138. The front end 120 interfaces with the host system 100 and one or more flash interface modules (FIMs) 138 provide a communication interface between the system controller 118 with the flash memory 116. The controller memory 122 may store controller firmware logic for coordinating operation of the flash memory 116 and for internal memory management operations. As one example, the controller firmware, when executed by the processor 136, may perform a multitude of operations, such as managing host communications, mapping host requests to NAND addresses, executing NAND operations, reporting completion status to host, etc. As another example, the controller firmware may include counter management firmware 124 that, when executed, includes the functionality discussed in more detail below. Examples of the firmware may include assignor module 126, analyzer module 128, and reassignor module 130. As discussed in more detail below, one or more counters, such as counter 1 (132) to counter N (134) may be assigned, such as by assignor module 126, to different ranges of memory, such as different LBA ranges. The values assigned to the counters may be analyzed, such as by analyzer module 128. In response to the analysis, one or more of the counters may be reassigned, such as by reassignor module 130, to different ranges of memory.

As discussed above, assignor module 126, analyzer module 128, and reassignor module 130 are included in firmware. Any one, any combination or all of assignor module 126, analyzer module 128, and reassignor module 130 can be implemented as software, hardware, or a combination of hardware and software inside system controller 118 or can be implemented as a component outside of the system controller 118. Further, assignor module 126, analyzer module 128, and reassignor module 130 are illustrated in FIG. 1A as separate entities. Alternatively, any combination or all of assignor module 126, analyzer module 128, and reassignor module 130 may be included in a single software program or in a single hardware implementation. The functions of the system controller 118 as depicted in FIG. 1A are merely for illustration purposes.

Figure 1B:
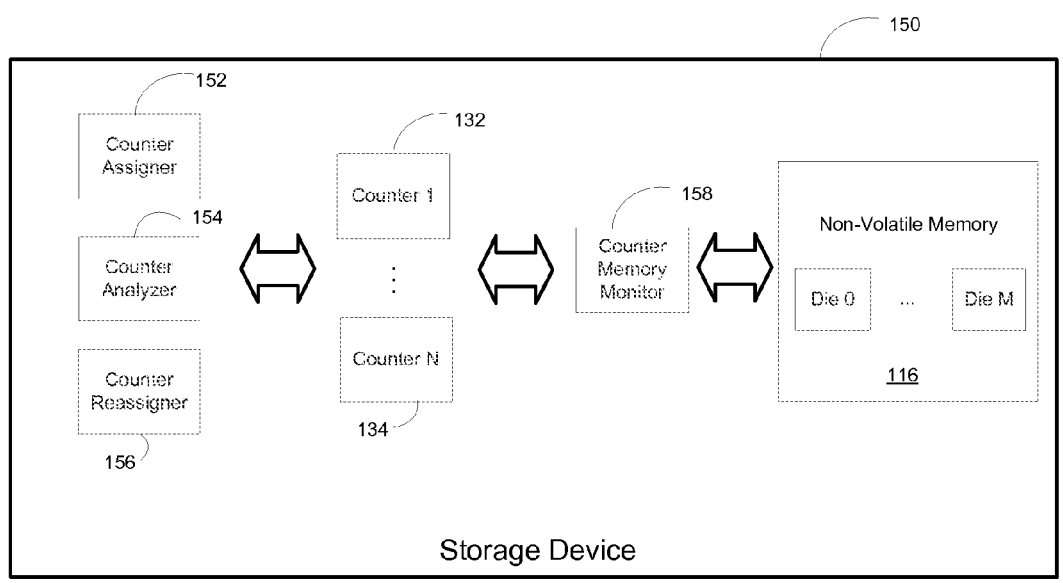
FIG. 1B illustrates a storage device.

FIG. 1B illustrates a storage device 150. The storage device 150 includes counter assigner 152, counter analyzer 154, and counter reassigner 156. The storage device 150 further includes counter 1 (132) . . . counter N (134). Further, storage device 150 includes counter memory monitor 158. In addition, the storage device 150 includes non-volatile memory 116.

Figure 2:
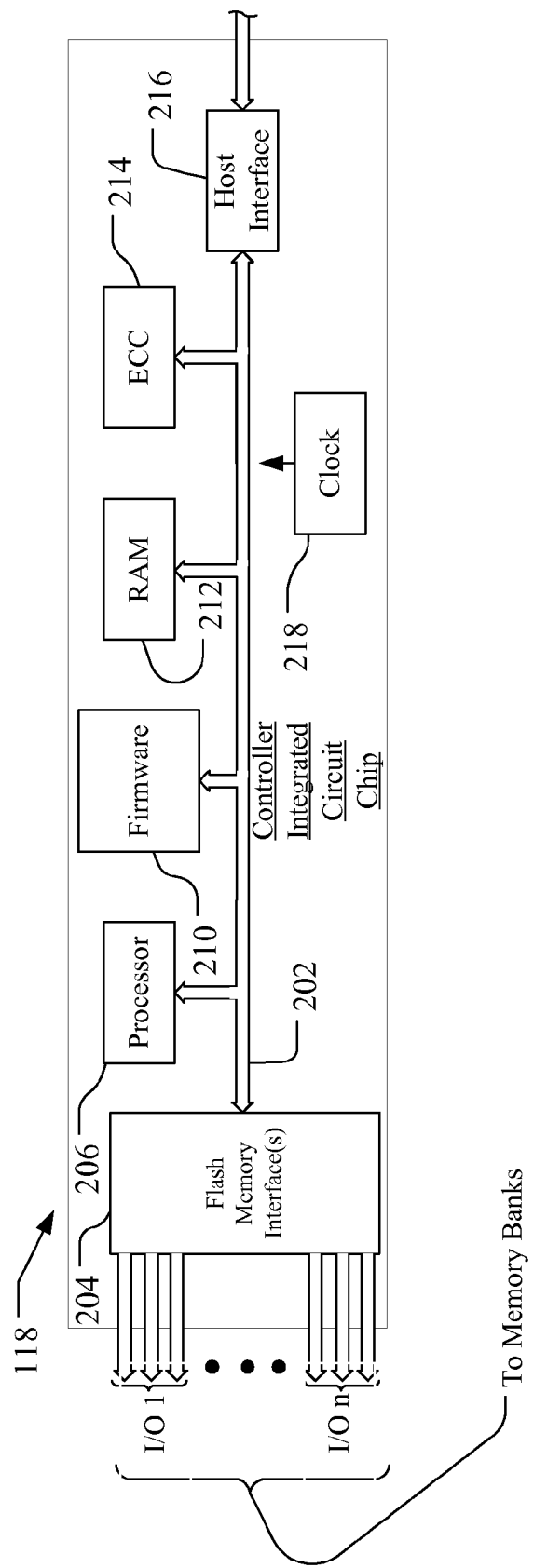
FIG. 2 is an example block diagram of an example flash memory system controller for use in the multiple die non-volatile memory of FIG. 1.

The system controller 118 may be implemented on a single integrated circuit chip, such as an application specific integrated circuit (ASIC), as shown in FIG. 2. Further, the various functions performed by the system controller 118 may be performed by a single device, or may be performed by multiple devices, such as shown in FIG. 2. More specifically, the system controller 118 may be segmented into the different devices illustrated in FIG. 2, such as flash memory interface(s) 204, processor 206, RAM 212, ECC 214, host interface 216, and clock 218. FIG. 2 is merely for illustration purposes.

The processor 206 of the system controller 118 may be configured as a multi-thread processor capable of communicating separately with each of the respective memory die 140, 142, 144, 146 via one or more flash memory interface(s) 204. FIG. 2 illustrates a single processor (processor 206). Alternatively, multiple processors may be resident in system controller 118.

The flash memory interface(s) 204 may have I/O ports for each of the respective die 140, 142, 144, 146 in the flash memory 116. The system controller 118 may include an internal clock 218. The processor 206 may communicate with an error correction code (ECC) module 214, a RAM buffer 212, a host interface 216, and firmware 210 via an internal data bus 202.

Figure 3:
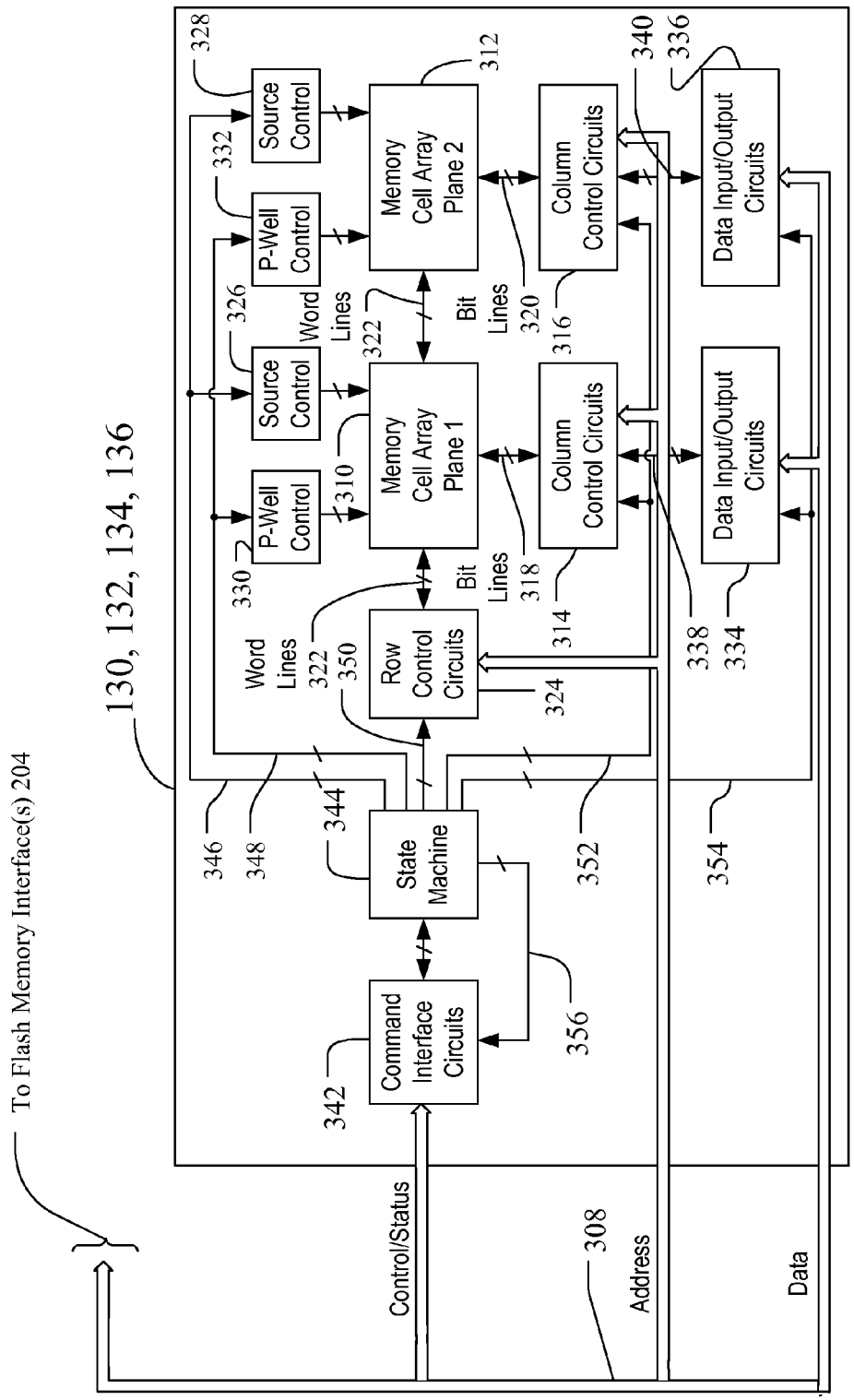
FIG. 3 is an example one flash memory bank suitable as one of the non-volatile memory banks illustrated in FIG. 1A.

Each die 140, 142, 144, 146 in the flash memory 116 may contain an array of memory cells organized into multiple planes. FIG. 3 shows planes 310 and 312 for simplicity but a lesser number, such as one plane or a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array, and decode them to address a specific one or more of respective bit lines 318 and 320. The word lines 322 are addressed through row control circuits 324 in response to addresses received on the bus 308. Source voltage control circuits 326 and 328 are also connected with the respective planes, as are p-well voltage control circuits 330 and 332. If the bank is in the form of a memory chip with a single array of memory cells, and if two or more such chips exist in the system, data are transferred into and out of the planes 310 and 312 through respective data input/output circuits 334 and 336 that are connected with the bus 308. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each die 140, 142, 144, 146 to program data, read data, erase and attend to various housekeeping matters, each memory chip also contains some controlling circuitry that executes commands from the controller 118 to perform such functions. Interface circuits 342 are connected to the bus 308. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus 308.

A NAND architecture of the memory cell arrays 310 and 312 is discussed below, although other architectures, such as NOR, can be used instead. An example NAND array is illustrated by the circuit diagram of FIG. 4, which is a portion of the memory cell array 310 of the memory bank of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
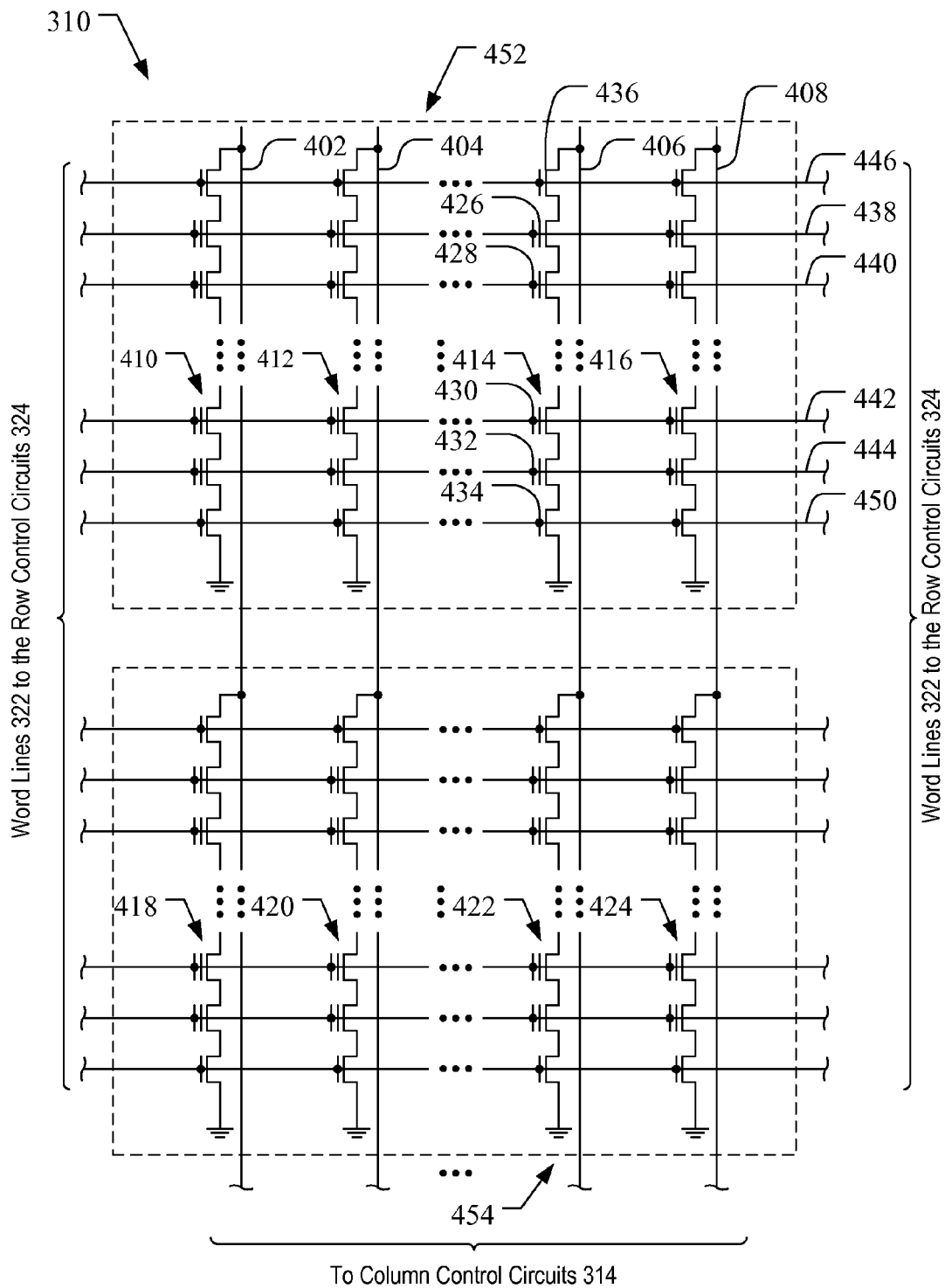
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. The row along the word line 438 is programmed last.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi-level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 5:
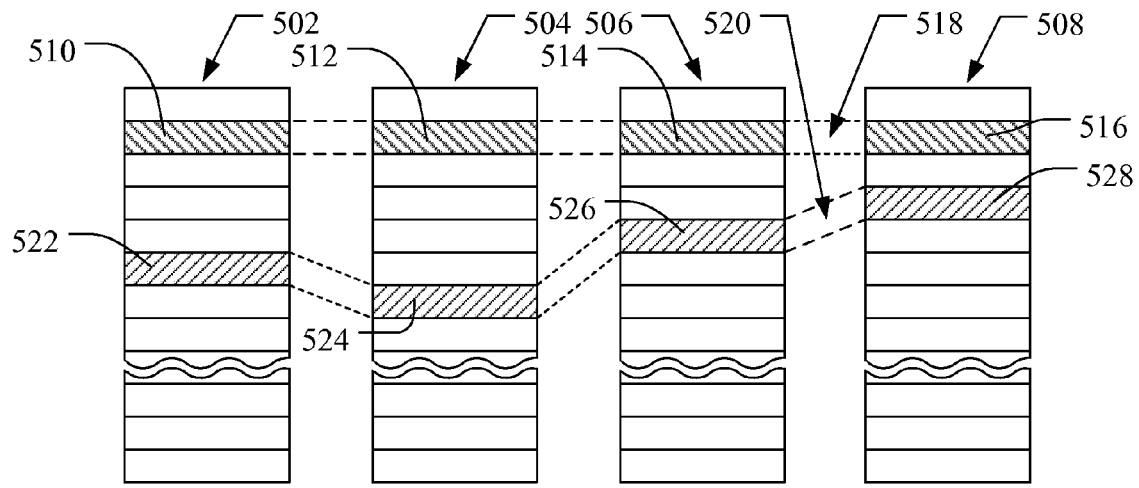
FIG. 5 illustrates an example physical memory organization of the memory bank of FIG. 3.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds of blocks in each plane.

As mentioned above, a block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory device can be operated with the ability to dynamically form metablocks of any or all of one, two or three blocks in different planes. This allows the size of the metablock to be more closely matched with the amount of data available for storage in one programming operation.

Figure 6:
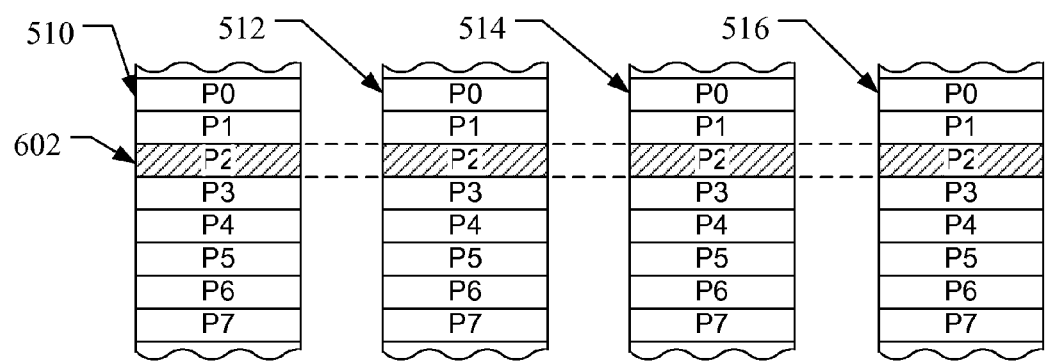
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 32, 64 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory device operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks. Within a die, a metapage is the maximum unit of programming.

Typically, a counter is assigned to a section in memory, such as each block to monitor the number of reads within the block. Further, once assigned, the counter cannot be reassigned. Given that there are typically many blocks (e.g., 256K) and that the counter is 4-bytes, 1 MB needs to be allocated for the counters.

In one embodiment, memory monitors assigned to different sections of memory may be reassigned, such as reassigned based on analysis of the activity in one or more sections of the memory. In a more specific embodiment, the memory monitors comprise counters that are assigned to the different sections of memory and that may be reassigned, such as reassigned based on analysis of the activity in one or more sections of the memory. In still a more specific embodiment, counters are reassigned such that the number of counters before and after reassignment of counters are the same. Counters are merely one example of a device configured to monitor a section of memory. Other devices configured to monitor a section of memory are contemplated.

For example, in response to determining that a section of memory has more than a predetermined amount of activity (e.g., such as more than a predetermined number of reads) and/or a section of memory has less than a predetermined amount of activity (e.g., such as less than a predetermined number of reads), the counters are reassigned so that more counters are assigned to section(s) of memory with more activity and fewer counters are assigned to section(s) of memory with less activity. In this regard, a self-adaptive reads counter system is disclosed in which a tree structure may be used to track hot/cold read areas in Logical Block Addresses (LBA). More specifically, the system may learn the LBA pattern and automatically identify the Logical Read Hot Zone (LRHZ). As discussed in more detail below, the LRHZ may be mapped to SLC blocks, which may improve endurance and read throughput.

Figure 7:
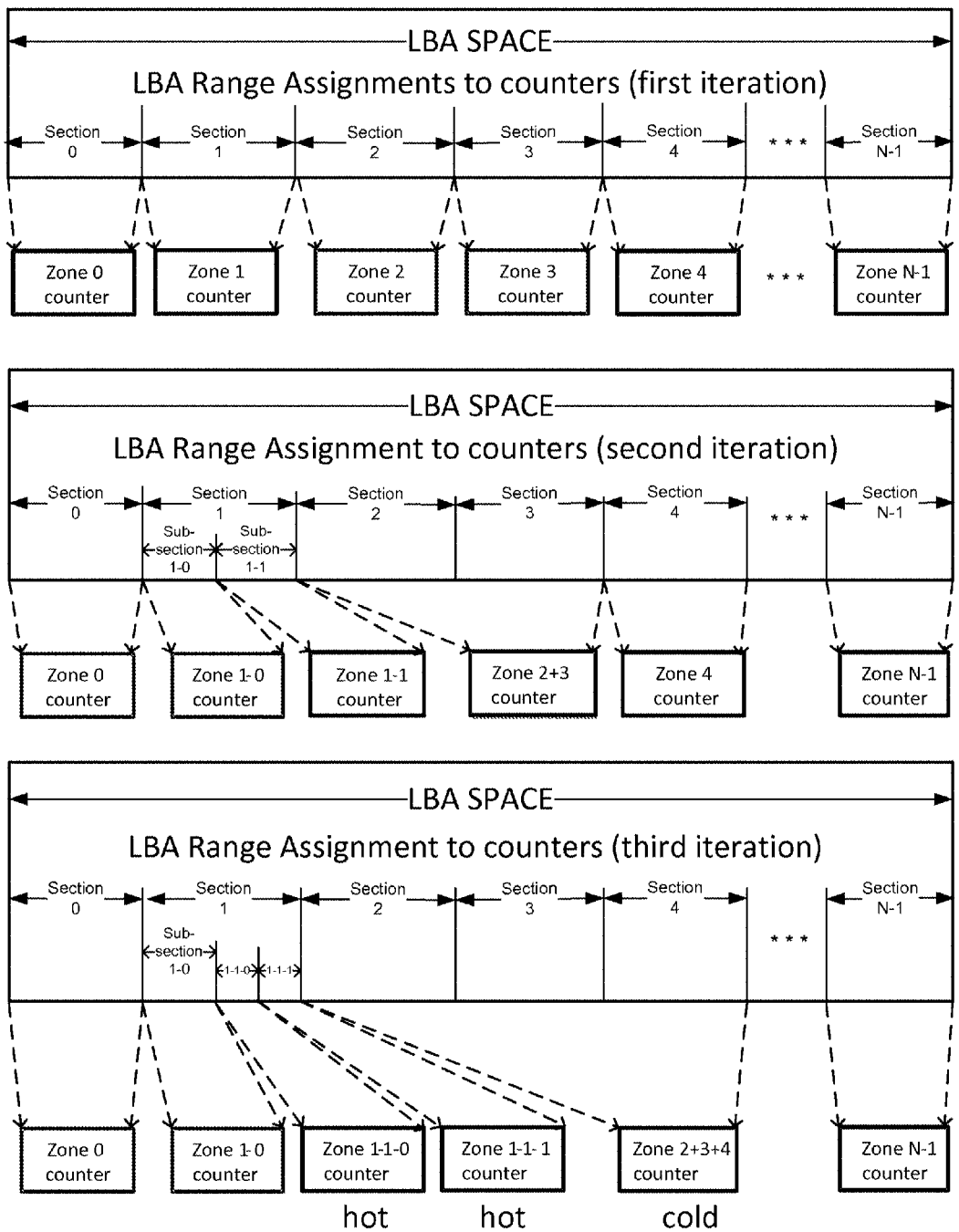
FIG. 7 is a block diagram illustrating multiple iterations of assigning counters to different sections (or sub-sections) of LBA space.

FIG. 7 is a block diagram illustrating multiple iterations of assigning counters to different sections (or sub-sections) of LBA space. Thus, in one embodiment, the counters are assigned to sections of LBA space, as shown in FIG. 7. In an alternate embodiment, the counters may be assigned to sections of physical space. In this regard, any discussion herein directed to assigning counters to sections of LBA space may likewise be applied to assigning counters to sections of physical space. Further, any discussion herein directed to counters may generally be applied to any memory monitor configured to monitor a section of memory.

In a first iteration, the counters may be assigned to part (or all) of LBA space. In one embodiment, in the initial assignment, the counters are divided evenly amongst the different LBA ranges within the LBA space. For example, the part (or all) of LBA space which is to be assigned counters is divided by the number of counters so each counter is assigned the same amount of LBA range. The even assignment of the LBA range is due to a lack of information as to activity in the LBA space.

As illustrated in FIG. 7, the entire LBA space is divided evenly in the first iteration. For example, the LBA space is divided evenly into N sections, such as section 0 (which corresponds to LBA range_0), section 1 (which corresponds to LBA range_1), . . . section N-1 (which corresponds to LBA range_N-1). As discussed above, in an alternate embodiment, less than the entire LBA may be divided and assigned to counters.

The sections may then be assigned to counters. For example, section 0 may be assigned to counter 0, section 1 may be assigned to counter 1, . . . and section N-1 may be assigned to counter N-1. FIG. 7 is merely for illustration purposes. For example, the counters may be initially assigned to an identified section or to an identified range. Alternatively, the counters may be initially assigned to a plurality of sections or to non-contiguous ranges.

After initial assignment of the counters, activity in part or all of the LBA range may be analyzed. The analysis of the activity may be triggered based on one or more factors. In one embodiment, the trigger to analyze whether to reassign counters is based on activity within part of the LBA (such as within one of the identified ranges of memory.

Based on the analysis, the counters may be reassigned, as discussed in more detail below. For example, if the LBAs in a certain section have been read frequently, the section may be split into two sub-sections. Alternatively (or in addition), if the LBAs in multiple sections have been read infrequently, the multiple section may be combined.

In one embodiment, the trigger to analyze whether to reassign counters may be based on activity in a respective section (or a respective plurality of sections). For example, a read in a respective section may trigger analysis whether to reassign counters. In an alternate embodiment, the trigger to analyze whether to reassign counters may be based on inactivity in a respective section (or a respective plurality of sections). For example, determining that no reads have occurred in a respective section may trigger analysis whether to reassign counters. In still an alternate embodiment, the trigger to analyze whether to reassign counters may be based on both activity and inactivity in a respective section.

As illustrated in FIG. 7, in the second iteration, section 1 of the LBA range was initially assigned to zone 1 counter. After analysis of the value of the zone 1 counter, it was determined to split section 1 and assign counters to each of the sub-sections. As discussed in more detail below, the value of the zone 1 counter has exceeded a threshold, resulting in the determination to split section 1. For example, section 1 is split evenly into subsection 1-0 and subsection 1-1 (so that subsection 1-0 equals subsection 1-1), with zone counter 1-0 and zone counter 1-1 assigned respectively.

As illustrated in FIG. 7, section 1 is split into two sections. In an alternative embodiment, the split of a section may be into more than two sections (such as three, four, or more sections). Further, FIG. 7 illustrates that section 1 is evenly split. In an alternative embodiment, the split (whether into two or more sections) may be uneven.

In conjunction with splitting section 1, it may desirable to keep the same total number of counters during a period of the life of the memory device (such as during a specific period or throughout the life of the memory device). In this regard, other sections may be selected. In one embodiment, the analysis focuses on adjacent sections, such as adjacent LBA ranges. More specifically, after analysis of the values of the counters, it is determined that the two adjacent zones with the smallest read times are zone 2 and zone counter 3. In response to this determination, sections 2 and 3 are combined, and assigned single counter to combined sections 2 and 3.

As illustrated in FIG. 7, in the third iteration, section 1-1 of the LBA range was initially assigned to zone 1-1 counter. After analysis of the value of the zone 1-1 counter, it was determined to split section 1-1 and assign counters to each of the sub-sections. More specifically, the value of the zone 1-1 counter has exceeded a threshold (which may be dynamic), resulting in the determination to split section 1-1. For example, section 1-1 is split evenly into subsection 1-1-0 and subsection 1-1-1 (so that subsection 1-1-0 equals subsection 1-1-1), with zone counter 1-1-0 and zone counter 1-1-1 assigned respectively. Again, the split of section 1-1 does not necessarily need to be even, and the split may be into more than two sub-sections. Further, in order to keep the same total number of counters during a period of the life of the memory device, the values of the counters are analyzed to determine which adjacent zones have the lowest reads. As illustrated in FIG. 7, sections 2+3 and section 4 have the lowest reads, resulting in the sections being combined into sections 2+3+4, and Zone 2+3+4 being assigned. Following this pattern, the memory device may track the read hot areas with "finer" counters and read cold areas with "coarser" counters.

Figure 8:
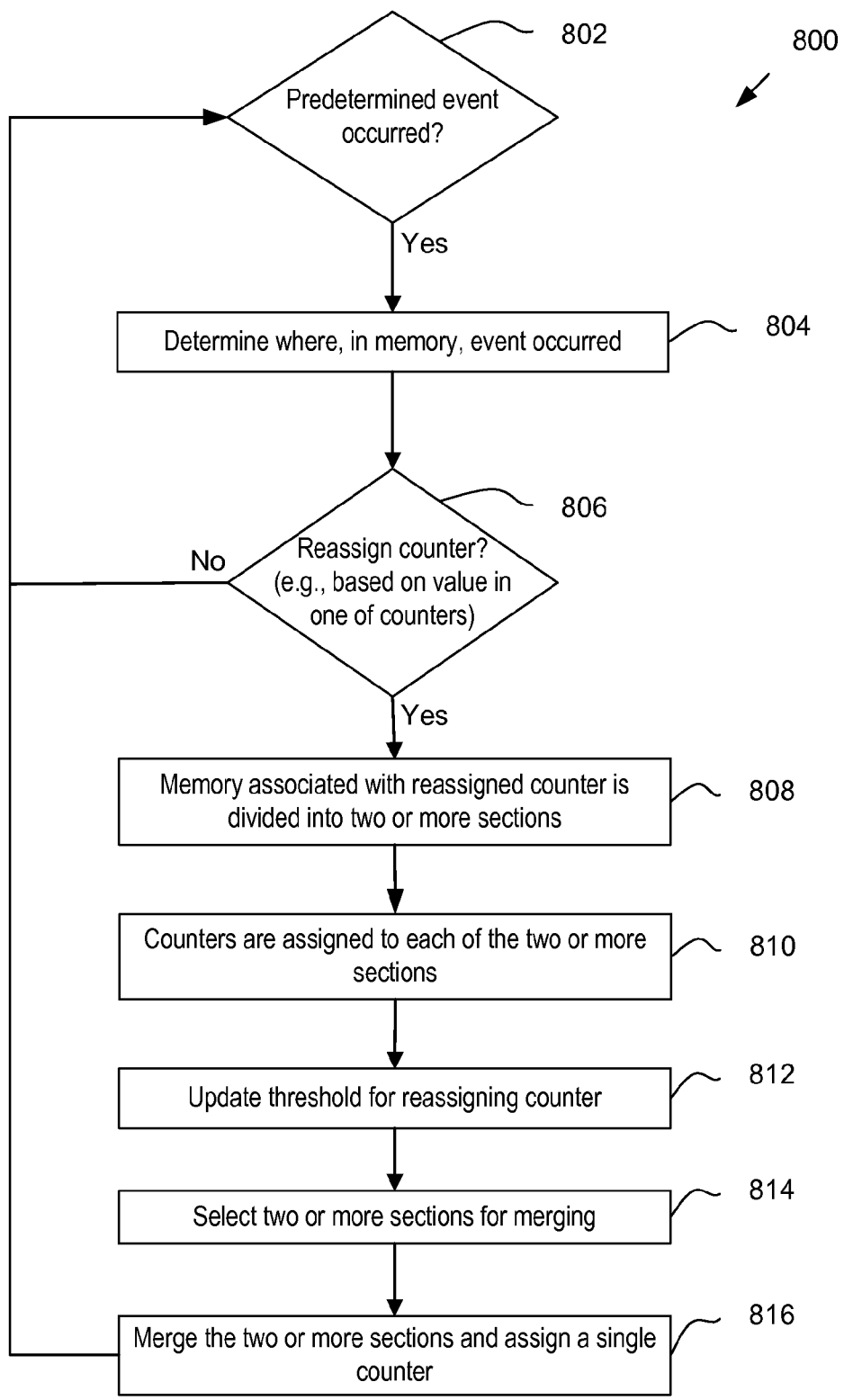
FIG. 8 illustrates one example of a flow diagram for reassigning counters to sections of memory.

FIG. 8 illustrates one example of a flow diagram 800 for reassigning counters to sections of memory. At 802, it is determined whether predetermined event has occurred. As discussed above, the predetermined event may comprise activity (such as a read event), inactivity, or a combination of activity and inactivity. At 804, in response to determining that the predetermined event has occurred, determine where in memory event has occurred. At 806, it is determined whether to select a counter for reassignment, such as based on the value of one of the counters. For example, the value of a counter may be compared with a threshold. In response to determining that the value of the counter is greater (or less) than the threshold, the counter is selected for reassignment.

In response to determining not to reassign the counter, flow chart 800 loops back to 802. In response to determining to reassign the counter, at 808, the memory associated with the selected counter for reassignment is divided into two or more sections. Further, at 810, counters are assigned to each of the divided two or more sections.

In one embodiment, the threshold used at 806 to compare with the value of the counter may be dynamic. In this regard, at 812, the threshold for reassigning the counter is updated. In one embodiment, the threshold used at 806 to compare with the value of the counter may be static.

At 814, two or more sections of memory are selected for merging. In one embodiment, the two or more sections of memory are selected for merging based on the values of the counters associated with the two or more sections. More specifically, the values of the counters may be analyzed, and the two or more sections associated with the lowest values of the counters (such as the lowest values of counters for adjacent sections) may be selected. At 816, the two or more sections may be merged and a single counter may be assigned to the merged sections.

Figure 9:
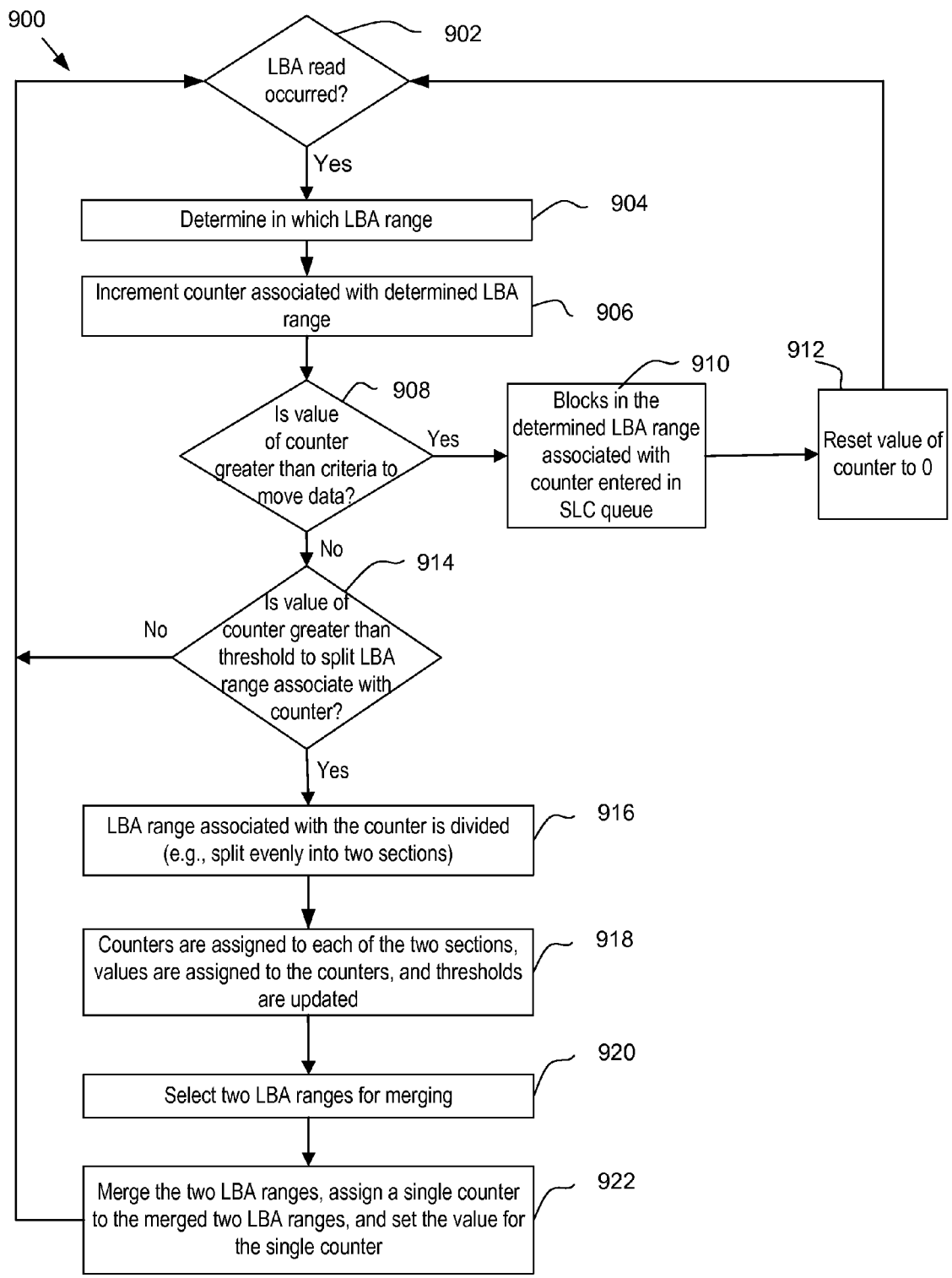
FIG. 9 illustrates another example of a flow diagram for reassigning counters to sections of memory.

FIG. 9 illustrates another example of a flow diagram 900 for reassigning counters to sections of memory. At 902, it is determined whether an LBA read has occurred. As discussed above, a variety of triggers may be used, such as an LBA read. At 904, it is determined in which LBA range the read has occurred. In order to determine in which LBA range the read has occurred, the memory device may maintain a table to manage the counters. In the table, each counter may be specified with: Reading; Range_Lower; Range_Upper; and Ave_Threshold_Next_Split. Reading is the current count number. Range_Lower and Range_Upper define the lower and upper bound of the counter's range. Ave_Threshold_Next_Split is the threshold for its next split. Thus, for each LBA read, the memory device may first determine in which zone/counter this LBA read belongs to according to counters' Range_Lower and Range_Upper and then the value associated with the counter is incremented.

At 906, the counter associated with the determined LBA range is incremented. At 908, it is determined whether the value of the counter that was incremented is greater than criteria to move the data. If the value of the counter is greater than the criteria to move the data, at 910, blocks in the determined LBA range that are associated with the incremented counter are entered in SLC queue. At 912, the counter is reset to 0 (zero).

If the value of the counter is not greater than the criteria to move the data, at 914, it is determined whether the value of the counter is greater than the threshold to split the section associated with the counter. If it is determined that the value of the counter is not greater than the threshold to split the section associated with the counter, the flow chart 900 loops back to 902.

One example of the threshold discussed at 914 is a self. threshold. self.threshold may be defined is as follows:

self.Threshold=self.reading/self.rangesize+4*(NUM_split+1)*THRESHOLD_STEP where self.rangesize is the range, such as defined by Range_Lower and Range_Upper;

NUM_split is the number of times the counter has been split in this range;

THRESHOLD_STEP is a constant unit value to increase self.Threshold for its next split.

Thus, one example of the determination at 914 is as follows:

Nth counter ave_reading>self.threshold, wherein Nth counter ave_reading is the value of the counter divided by the range of the counter. More specifically, one example of determining the Nth counter ave_reading is self.reading/self.rangesize for Nth counter.

If it is determined that the value of the counter is greater than the threshold to split the section associated with the counter, at 916, the LBA range associated with the counter is split, such as evenly split into two sections. At 918, counters are assigned to each of the two sections, with values and thresholds assigned to each of the counters. For example, the values assigned to each of the counters may be based on the value of the counter whose LBA range was split. In one embodiment, the split of the sections determines the values assigned to each of the counters. More specifically, in the event that the LBA section is split evenly into two sections (such as illustrated in the second iteration of FIG. 7), the value associated with the counter assign to the LBA section is divided by 2, and attributed to the counters assigned to the two sections. As another example, in the event that the LBA section is split evenly into three sections, the value associated with the counter assign to the LBA section is divided by 3, and attributed to the counters assigned to the three sections.

At 920, two or more LBA ranges are selected for merging. As discussed above, the values associated with the counters may be analyzed to determine which LBA ranges are selected for merging. For example, the LBA ranges that have the lowest values of the counters may be merged, thereby indicating the LBA ranges that have the least amount of the activity being monitored by the counters. As a more specific example, the adjacent LBA ranges that have the lowest values of counters may be merged. At 922, the two LBA ranges are merged and assigned a single counter to monitor activity in the merged two LBA ranges. Further, the single counter is assigned a value based on the counters of previously assigned to each of the merged two LBA ranges. For example, values assigned to each of the merged LBA ranges may be added together and assigned to the single counter assigned LBA ranges. The flow chart 900 then loops back to 902.

In this regard, if the value of the counter is less than the criteria at 908, but is greater than its split threshold at 914, the memory device may perform a 'split' operation in which the counter is split in the middle into two separate counters, each of which will have half of its original range and reading will be half of its original reading. At the same, to keep the total number of counters the same, two adjacent counters with lowest reading will be merged together.

Accordingly, the method and system may be realized in hardware, software, or a combination of hardware and software. The method and system may be realized in a centralized fashion in at least one electronic device (such as illustrated in flash memory device 102 in FIG. 1A) or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be implemented using a computer-readable media. For example, controller firmware 124 may be implemented using computer-readable media to implement the functionality described herein, such as discussed in FIGS. 8-9. A "computer-readable medium," "computer-readable storage medium," "machine readable medium," "propagated-signal medium," or "signal-bearing medium" may include any tangible device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. The computer-readable medium can be a single medium or multiple media. Accordingly, the disclosure may be considered to include any one or more of a computer-readable medium or a distribution medium and other equivalents and successor media, in which data or instructions can be stored. For example, the processor 210 may access instructions stored in memory, such as RAM 212, in order to provide the functionality herein. As another example, the flash memory interface(s) may be configured to implement the functionality described herein. In either example, the system controller 118 may include a device that is configured to perform the functionality described herein.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

What is claimed is:

1. A method comprising:
performing in a memory device:
assigning counters to respective address ranges within an overall address range in a memory of the memory device so that N counters are assigned, a value of a respective counter being indicative of predetermined activity within the respective address range;
analyzing one or more of the values of the respective counters; and
in response to the analysis:
selecting a new address range that is different from and at least partly within at least one of respective address ranges; and
reassigning one or more of the counters or assigning a new counter to the new address range such that, after reassigning, a total number of N counters assigned to the overall address range remains constant.

2. The method of claim 1, wherein the value of the respective counter is indicative of read activity within the respective address range;
wherein analyzing the value of the respective counter comprises:
comparing the value of the respective counter to a threshold; and
determining whether the value of the respective counter is greater than the threshold,
wherein in response to determining that the value of the respective counter is greater than the threshold, selecting the new address range to be less than and at least partly within the respective address range.

3. The method of claim 2, wherein selecting the new address range comprises dividing the respective address range into at least a first sub-address range and a second sub-address range; and
wherein reassigning the counter or assigning a new counter to the new address range comprises assigning a first counter to the first sub-address range and a second counter to the second sub-address range.

4. The method of claim 3, wherein dividing the respective address range into at least the first sub-address range and the second sub-address range comprises evenly dividing the respective assigned address range such that the first sub-address range and the second sub-address range are equal in size; and
further comprising:
evenly dividing the value of the respective counter; and
assigning the evenly divided value of the respective counter to each of the first counter and the second counter.

5. The method of claim 4, further comprising:
selecting at least two additional address ranges, each of which is assigned a respective counter, the selecting being based on values of the respective counters;
adding the values of the respective counters to generate a combined value;
assigning a single counter to a combination of the at least two additional address ranges; and
assigning the combined value to the single counter.

6. The method of claim 5,
further comprising:
dividing the overall address range into "N" address ranges;
wherein, based on values assigned to the respective counters, the respective counters are reassigned to different address ranges.

7. The method of claim 2, wherein the threshold is dynamic.

8. The method of claim 7, wherein the threshold is dependent on a number of times the address range has been divided.

9. A method comprising:
performing in a memory device:
assigning a counter to an address range within a memory of the memory device, a value of the counter being indicative of predetermined activity within the address range;
comparing the value of the counter to a threshold; and
based on the comparison of the value of the counter to the threshold:
selecting a new address range that is different from and at least partly within the address range; and
dynamically reassigning the counter or assigning a new counter to the new address range,
wherein the threshold is indicative that the higher the number of times the address range has been divided, the less likely the address range will be divided again.

10. The method of claim 1, wherein the address range comprises a logical address range.

11. An apparatus comprising:
a memory device;
an assigner module configured to assign N memory monitors to respective address ranges of the memory device such that a total of the respective address ranges assigned for the N memory monitors equals an overall address range;
an analyzer module configured to analyze values associated with one or more of the plurality of memory monitors, the value of a respective memory monitor indicative of at least one aspect in the respective address range; and
a reassignor module configured to reassign at least one respective address of a respective memory monitor based on the analyzed values such that the total of the respective address ranges for the plurality of memory monitors, after reassignment, equals the overall address range and such that, after reassignment, the overall address range is monitored by N memory monitors.

12. The apparatus of claim 11, wherein the memory monitors comprise counters.

13. The apparatus of claim 11, wherein the reassignor module is configured to:
select at least one memory monitor;
split a respective address range assigned to the selected at least one memory monitor to generate a first address sub-range and a second address sub-range;
assign memory monitors to each of the first address sub-range and the second address sub-range;
select at least two memory monitors;
combine respective address ranges assigned to the selected at least two memory monitors to generate a combined address range; and
assign a single memory monitor to the combined address range.

14. The apparatus of claim 13, wherein the reassignor module is configured to split the respective address range evenly so that the first address sub-range and the second sub-address range are equal in size.

15. The apparatus of claim 13, wherein the reassignor module is configured to select the at least one memory monitor and to select the at least two memory monitors based on respective values assigned to the at least one memory monitor and to the at least two memory monitors.

16. The apparatus of claim 15, wherein the respective values assigned to the at least one memory monitor and to the at least two memory monitors are, respectively indicative of read activity within an assigned address range.

17. The apparatus of claim 16, wherein the value of a respective memory monitor is indicative of read activity within the respective address range;
wherein the reassignor module is configured to determining a highest value; and
wherein the reassignor module is configured to select the at least one memory monitor with the highest value.

18. The apparatus of claim 17, wherein the reassignor module is configured to select the at least two memory monitors to have adjacent assigned address ranges.

19. An apparatus comprising:
a memory;
a counter configured to store a value;
a counter assignment module configured to assign N counters to respective address ranges across a combined address range within the memory, the value of the counter indicative of reads within the respective address range;
a counter analyzer configured to analyze the value of one or more of the counters; and
a counter reassignor module configured to reassign, based on the analysis of the value of one or more of the counters, the N counters to different address ranges across the combined address range within the memory.

20. The apparatus of claim 19, wherein at least one of the different address ranges is at least partly contained within at least one of the respective address ranges.

21. The apparatus of claim 20, wherein the at least one of the respective address ranges comprises a lower boundary for the address range and an upper boundary; and
wherein the at least one of the different address range shares only one of the lower boundary or the upper boundary and does not share the other of the lower boundary or the upper boundary.

22. The apparatus of claim 19, wherein the counter reassignor module is configured to iteratively reassign a counter to each of the different address ranges.

* * * * *